(12) United States Patent
Tanaka et al.

(10) Patent No.: US 6,271,612 B1
(45) Date of Patent: Aug. 7, 2001

(54) SPINDLE MOTOR

(75) Inventors: Katsu Tanaka; Ikunori Sakatani; Etsuo Maeda, all of Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/471,339

(22) Filed: Dec. 23, 1999

(30) Foreign Application Priority Data

| Dec. 24, 1998 | (JP) | 10-367963 |
|---|---|---|
| Oct. 19, 1999 | (JP) | 11-296478 |
| Dec. 2, 1999 | (JP) | 11-343892 |

(51) Int. Cl.[7] .................... H02K 5/16; F16C 32/06
(52) U.S. Cl. .................... 310/90; 384/107; 384/113
(58) Field of Search .................... 310/90, 67 R; 384/100, 107, 111, 112, 113

(56) References Cited

U.S. PATENT DOCUMENTS

| 4,795,275 | * | 1/1989 | Titcomb et al. | 384/107 |
|---|---|---|---|---|
| 5,524,728 | * | 6/1996 | Williams et al. | 184/29 |
| 5,533,811 | * | 7/1996 | Polch et al. | 384/107 |
| 5,658,080 | * | 8/1997 | Ichiyama | 384/112 |
| 5,707,154 | * | 1/1998 | Ichiyama | 384/107 |
| 5,791,784 | * | 8/1998 | Ichiyama | 384/107 |
| 5,941,644 | * | 8/1999 | Takahashi | 384/112 |

FOREIGN PATENT DOCUMENTS

| 2509752 | 4/1996 | (JP) | F16C/17/02 |
|---|---|---|---|
| 8-277835 | 10/1996 | (JP) | F16C/17/00 |
| 8-340657 | 12/1996 | (JP) | H02K/7/08 |
| 10-213127 | 8/1998 | (JP) | F16C/17/02 |
| 11-2235 | 1/1999 | (JP) | F16C/17/02 |

* cited by examiner

*Primary Examiner*—Nicholas Ponomarenko
*Assistant Examiner*—Dang Dinh Le
(74) *Attorney, Agent, or Firm*—Sughrue, Mion, Zinn, Macpeak & Seas, PLLC

(57) ABSTRACT

A spindle motor in which a shaft and a sleeve are supported by a radial fluid bearing and a thrust bearing in a noncontact state via a bearing clearance and are relatively driven rotatively, a lubricant reservoir having one end communicating with the bearing clearance and another end communicating with the outside is provided on an outer peripheral side of the sleeve whose inner periphery opposes the shaft, and a lubricant supplying passage, which is a clearance of the lubricant reservoir on its side which communicates with the bearing clearance, is set to a size exhibiting capillarity. Bubbles in the lubricant inside the lubricant reservoir are discharged through the clearance communicating with the outside, and the bearing clearance is automatically lubricated stably through the lubricant supplying passage by means of capillarity.

6 Claims, 9 Drawing Sheets

SPINDLE MOTOR

BACKGROUND OF THE INVENTION

1. Field of the Invention

The present invention relates to a spindle motor for information equipment and audio and visual equipment, and more particularly to a spindle motor which excels in durability and reliability and is optimally suited to a laser printer, a scanner motor for a digital copying machine, a magnetic hard disk drive (hereafter abbreviated as the HDD), an optical disk drive, and the like.

2. Description of the Related Art

As a conventional spindle motor of this type, a spindle motor for a HDD, such as the one shown in FIG. 11, is known. In this spindle motor, a sleeve 2 is secured to a base 1, a shaft 3 is rotatably inserted in the sleeve 2, and a hub 4 is integrally attached to this shaft 3.

A lower end face of the shaft 3 is formed as a thrust receiving surface 3s, a thrust plate 6 having a thrust bearing surface 6s opposing this thrust receiving surface 3s is secured to the base 1, and a dynamic-pressure generating groove 7 of, for example, a spiral shape is provided in at least one of the thrust receiving surface 3s and the thrust bearing surface 6s, thereby forming a thrust fluid bearing S.

Meanwhile, a pair of radial receiving surfaces 3r are formed on an outer peripheral surface of the shaft 3 at upper and lower positions with an axial interval therebetween, while a pair of radial bearing surfaces 2r opposing the radial receiving surfaces 3r are formed on an inner peripheral surface of the sleeve 2, and a pair of dynamic-pressure generating grooves 8 of, for example, a herringbone-shape are provided in at least one of the radial receiving surfaces 3r and the radial bearing surfaces 2r, thereby forming a radial fluid bearing R.

The shaft 3 and the hub 4 are integrally driven rotatively by a motor M comprised of a stator 9 fixed to an outer periphery of the base 1 and a rotor magnet 10 fixed to an inside-diameter surface of the hub 4.

When the shaft 3 rotates, dynamic pressure is generated in a lubricant in each bearing clearance by means of the pumping action of the respective dynamic-pressure generating grooves 7 and 8 of the thrust fluid bearing S and the radial fluid bearing R, so that the shaft 3 is supported in a state of noncontact with the sleeve 2 and the thrust plate 6.

However, with the spindle motor in which the thrust fluid bearing S and the radial fluid bearing R are thus adopted as its bearings, if the spindle motor is used over extended periods of time, the lubricant held in the bearing clearances gradually decreases due to its evaporation and scattering during rotation. As a result, lubrication becomes faulty, so that if an attempt is made to use the spindle motor beyond the service life of the bearings, there has been the risk that the bearings become seized.

In addition, at the time of assembling by inserting the shaft 3 into the sleeve 2, the shaft 3 is inserted after a predetermined amount of lubricant is poured in advance onto a closed cylindrical surface in the space surrounded by the inner peripheral surface of the sleeve 2 and the thrust plate 6. For this reason, there has been a problem in that air is liable to become contained, and slight bubbles are liable to remain in the bearing clearances. The remaining bubbles can possibly cause the lubricant in the bearing clearances to be extruded to the outside as the bubbles expand due to a change in the atmospheric pressure which can occur when the assembled spindle motor product is transported by such as an airplane or due to a temperature rise during the rotation of the spindle motor in use.

SUMMARY OF THE INVENTION

The present invention has been devised by taking note of the above-described unresolved problems of the conventional art, and its object is to provide a spindle motor excelling in durability and reliability by providing a lubricant reservoir having the function whereby the bearing clearances are reliably replenished with the lubricant to compensate for the decrease of the lubricant and the remaining bubbles in the lubricant can be easily discharged.

To attain the above object, in accordance with the present invention, there is provided a spindle motor in which a shaft and a sleeve are opposed to each other via a bearing clearance of a radial fluid bearing and are relatively driven rotatively, so that a lubricant reservoir having one end communicating with the bearing clearance and another end communicating with the outside is provided on an outer peripheral side of the sleeve whose inner periphery opposes the shaft, and that a clearance of the lubricant reservoir on a side which communicates with the bearing clearance is set to a size exhibiting capillarity.

Here, the lubricant reservoir may be provided with a tapered surface formed on at least one of the mutually opposing inner wall surfaces in such a manner as to allow its clearance to become gradually narrower toward the bearing clearance.

In addition, that side of the lubricant reservoir which communicates with the bearing clearance may be open between the radial fluid bearing and a thrust bearing.

DETAILED DESCRIPTION OF THE INVENTION

Hereafter, a description will be given of the embodiments of the present invention by referring to the accompanying drawings.

Figure 1:
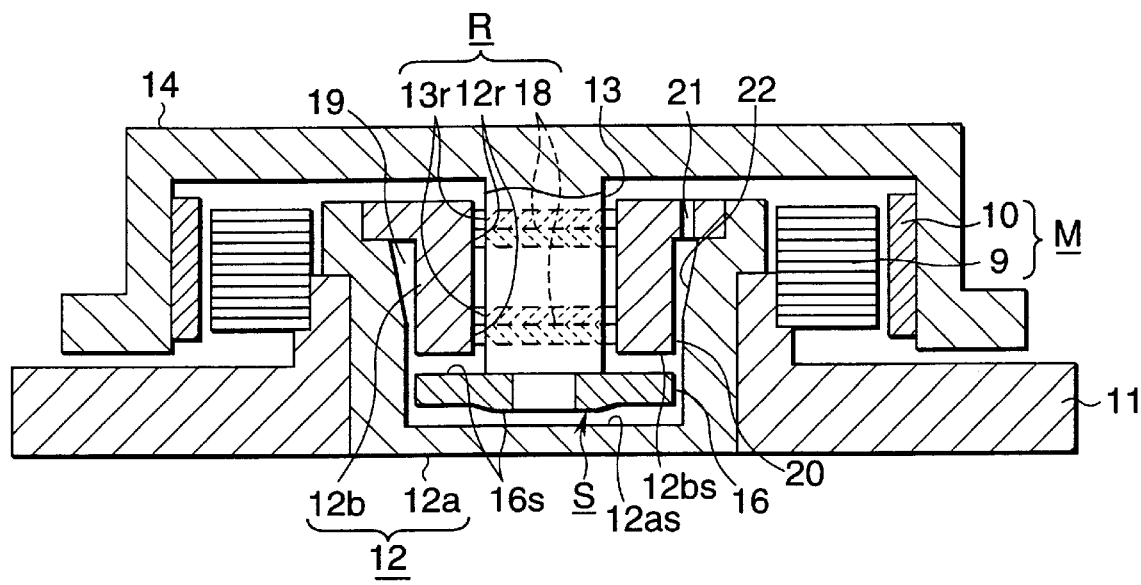
FIG. 1 is a cross-sectional view of a first embodiment of the present invention.

FIG. 1 is a cross-sectional view of a first embodiment of a type in which the sleeve is fixed and the shaft is adapted to rotate.

First, a description will be given of the construction. A sleeve 12 is secured to a base 11. This sleeve 12 is formed in a dual structure including a cup-shaped outer sleeve 12a and an inner sleeve 12b having the shape of a flanged cylinder and secured integrally to its upper end.

Meanwhile, a shaft 13 and a hub 14 of a shallow inverse cup shape are formed integrally, the shaft 13 extending downward is inserted in and passed through the inner sleeve 12b, and a disk-shaped thrust plate 16 is press-fitted and secured to a projecting lower end of the shaft.

Upper and lower flat surfaces of the thrust plate 16 are formed as thrust receiving surfaces 16s, while a lower end surface of the inner sleeve 12b, opposing the upper surface-side thrust receiving surface 16s, and a bottom surface of the outer sleeve 12a, opposing the lower surface-side thrust receiving surface 16s, are respectively formed as thrust bearing surfaces 12bs and 12as, and an unillustrated dynamic-pressure generating groove of a herringbone-shape or a spiral shape is provided in at least one opposing pair of the thrust receiving surface and the thrust bearing surface, thereby forming a thrust fluid bearing S.

A pair of radial receiving surfaces 13r are formed on an outer peripheral surface of the shaft 13 at upper and lower positions with an axial interval therebetween, while a pair of radial bearing surfaces 12r opposing the radial receiving surfaces 13r are formed on an inner peripheral surface of the inner sleeve 12, and a pair of dynamic-pressure generating grooves 18 of, for example, a herringbone-shape are provided in at least one of the radial receiving surfaces and the radial bearing surfaces, thereby forming a radial fluid bearing R.

In the sleeve 12 of the internal external dual structure, an annular clearance on the outer peripheral side of the inner sleeve 12b opposing the shaft 13, i.e., between the inner sleeve 12b and the outer sleeve 12a, i.e., its mating member, is formed as a lubricant reservoir 19. A lower-end clearance in the lubricant reservoir 19 is formed as a lubricant supplying passage 20 and is open between the thrust fluid bearing S and the radial fluid bearing R. Meanwhile, the upper end side of the lubricant reservoir 19 is closed by the flange of the inner sleeve 12b, but communicates with the outside of the lubricant reservoir 19 since an air vent hole 21 passing through the flange is provided.

The lubricant supplying passage 20 is formed such that the size of its opening portion is made equal to or slightly larger than the bearing clearance of each fluid bearing so as to be capable of holding the lubricant by means of the capillarity based on the surface tension.

Further, a tapered surface 22 is provided on the inner peripheral surface of the outer sleeve 12a surrounding the lubricant reservoir 19 so as to make the clearance in the lubricant reservoir 19 gradually narrower toward the lubricant supplying passage 20, thereby rendering the supply of the lubricant smooth. It should be noted that the tapered surface 22 is not necessarily formed on the inner peripheral surface of the outer sleeve 12a, and may be formed on the outer peripheral surface of the inner sleeve 12b, or may be formed on both the inner peripheral surface of the outer sleeve 12a and the outer peripheral surface of the inner sleeve 12b.

Figure 11:
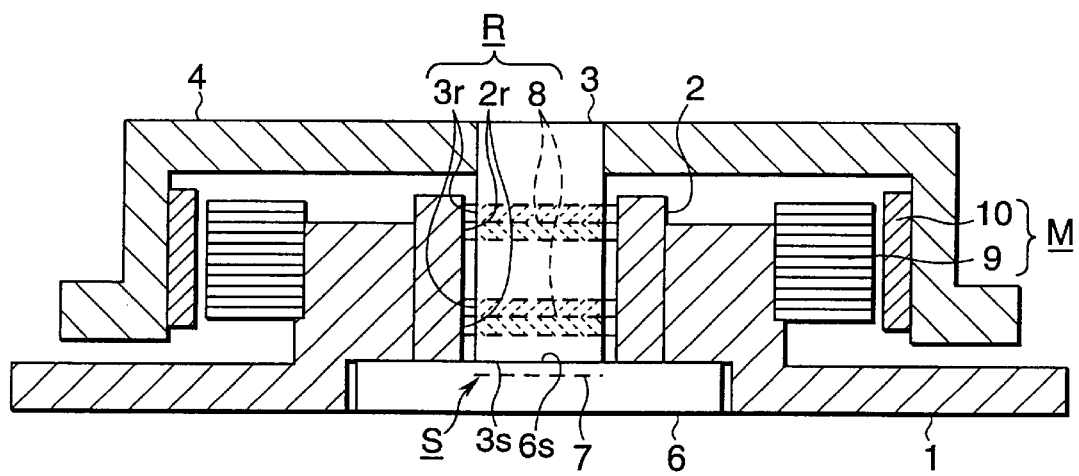
FIG. 11 is a cross-sectional view of a conventional spindle motor.

In the same way as shown in FIG. 11, a motor M comprised of a stator 9 fixed to an outer periphery of the base 11 and a rotor magnet 10 fixed to an inside-diameter surface of the hub 14 is mounted so as to rotatively drive the inverse cup-shaped hub 14 on which the unillustrated magnetic disk, i.e., a member to be rotated, is mounted.

Next, a description will be given of the operation.

A description will be given of one example of the procedure for assembling the spindle motor having the above-described arrangement. A predetermined amount of lubricant is poured in advance to the bottom of the cup-shaped outer sleeve 12a. Next, the thrust plate 16 is placed flatly on the bottom of the outer sleeve 12a, and after the inner sleeve 12b is assembled, the shaft 13 which is formed integrally with the hub 14 is press-fitted and secured to the thrust plate 16.

By the insertion of this shaft 13, the lubricant at the bottom is filled in each bearing clearance between the thrust fluid bearing S and the radial fluid bearing R, and is also accumulated in the lubricant reservoir 19 through the lubricant supplying passage 20.

During this assembly, the air included in the lubricant has the possibility of becoming mixed in the lubricant in the form of bubbles. In the case of this embodiment, however, since the bearing clearances communicate with the lubricant reservoir 19, the air in the space in the bearing clearances is extruded toward the lubricant reservoir 19 having a greater volume and is discharged to the outside through the air vent hole 21, with the result that the amount of bubbles contained in the lubricant is small. In addition, the contained bubbles in the lubricant are also discharged to the outside from above the radial fluid bearing R, while most of the contained bubbles are separated inside the lubricant reservoir 19 and are discharged to the outside through the air vent hole 21 in the flange of the inner sleeve 12b. Accordingly, it is possible to prevent the situation in which the bubbles in the lubricant are expanded during the transport or use of the spindle motor and extrude the lubricant in the bearing clearances to the outside, which can otherwise cause a shortage of the lubricant.

Thus, since the lubricant reservoir 19 in which the replenishing lubricant is held has the function of separating and discharging the bubbles, the operation of assembling the spindle motor in accordance with the present invention can be effected in the atmosphere. Moreover, since the thrust plate 16 press-fitted and secured to one end of the shaft 13 has a coming-off preventing function, there is no possibility of the shaft 13 from coming off the sleeve 12 due to an external shock in transit or use. It goes without saying that the assembling method need not be limited to the above-described method.

When the shaft 13 and the hub 14 are integrally driven rotatively by the motor M, dynamic pressure is generated in the lubricant filled in each bearing clearance of the thrust fluid bearing and the radial fluid bearing R by means of the pumping action, so that the shaft 13 and the hub 14 are supported in a state of noncontact with the sleeve 12 and the thrust plate 16.

When the lubricant held in the bearing clearances gradually decreases due to its evaporation and scattering during rotation and becomes short as the spindle motor is used over extended periods of time, the lubricant in the lubricant reservoir 19 is led to the lubricant supplying passage 20 in correspondence with the portion of the shortage while being guided by the tapered surface 22, and is sucked into the narrow communicating bearing clearance by capillarity. Then, the lubricant is stabilized at that position on the lubricant surface on the tapered surface 22 in the lubricant reservoir 19 where the surface tension is balanced.

In this embodiment, since the clearance in the lubricant reservoir 19 is tapered, the lubricant is sucked toward the side where the clearance is narrower by means of the surface tension, while the remaining bubbles contained during assembly are separated and discharged from the side where the clearance is wider.

Accordingly, bubble-free lubricant is reliably replenished automatically in correspondence with the decreased portion of the lubricant, and the bearing clearances are constantly filled with the lubricant, so that an advantage is offered in that it is possible to obtain a spindle motor excelling in durability and having high reliability.

In addition, since the lubricant reservoir is formed in the tapered shape, there is an advantage in that even if the spindle motor is turned upside down during its transport or use, it is possible to prevent the excess lubricant held from flowing out.

Further, since the lubricant reservoir is provided in the sleeve of the internal external dual structure, i.e., on the outer peripheral surface of the inner sleeve 12b, it is possible to obtain a large advantage in practical use in that the overall height of the spindle motor can be lowered.

Figure 2:
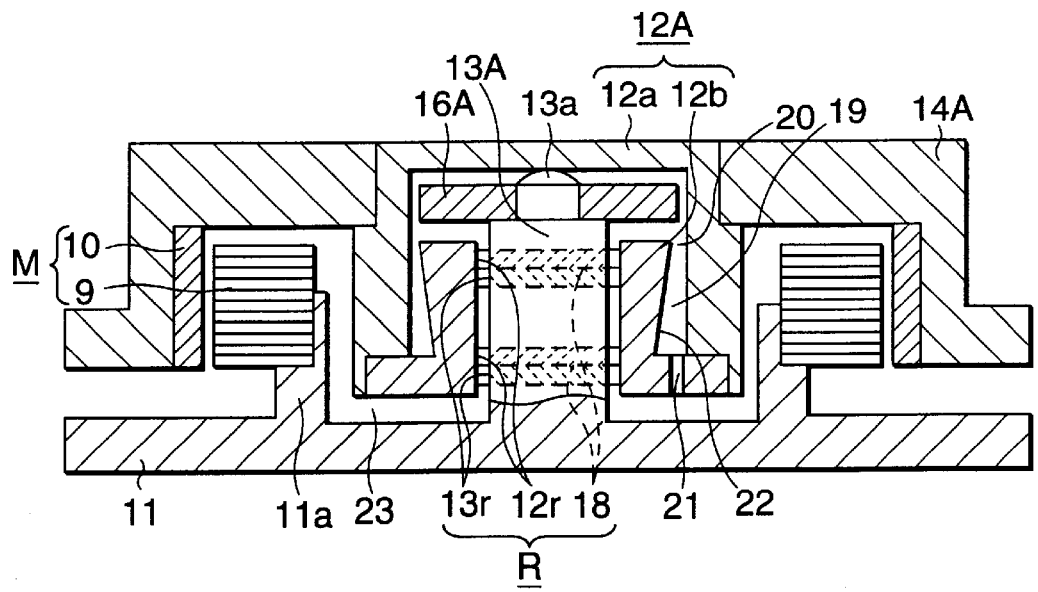
FIG. 2 is a cross-sectional view of a second embodiment of the present invention.

FIG. 2 is a cross-sectional view illustrating a second embodiment of the present invention.

It should be noted that, in this embodiment and embodiments that follow, all the portions that are identical to those of FIG. 1 will be denoted by the same reference numerals, and an overlapping description will be omitted.

The spindle motor in this second embodiment is of the type in which a shaft 13A is formed integrally with the base 11, and a sleeve 12A, which is supported by the fixed shaft 13A through a radial fluid bearing and a thrust fluid bearing, is adapted to rotate together with a hub 14A, i.e., the type in which the shaft is fixed, and the sleeve is adapted to rotate.

As for the sleeve 12A having the dual structure, its outer sleeve 12a is integrally fitted to the hub 14A in a state of an inverse cup, and the inner sleeve 12b having the shape of a flanged cylinder is secured to lower end of the outer sleeve. The lubricant reservoir 19 formed between the inner and outer sleeves has the lubricant supplying passage 20 provided on an upper end side of the lubricant reservoir 19.

In addition, the tapered surface 22 of the lubricant reservoir 19 is formed on the outer periphery of the inner sleeve 12b, and is inclined in such a manner as to cross-sectionally fan out starting from the bottom of the lubricant reservoir 19 toward the lubricant supplying passage 20 in the upper portion. As a result, when the sleeve 12A rotates and a centrifugal force acts, the lubricant in the lubricant reservoir flows along this tapered surface 22 and rises, and reaches the lubricant supplying passage 20 having a narrow clearance and is held therein. Thus, the lubricant is reliably replenished from the lubricant supplying passage 20 to the bearing clearances by the capillarity.

It should be noted that, in this embodiment, instead of providing the thrust fluid bearing S on the surface of a thrust plate 16A, the thrust bearing is formed as a pivot-supported thrust bearing and is constructed such that an upper end of the shaft 13A is formed as a convex spherical surface to support the sleeve 12A and the hub 14A which are rotating members, and the position of the rotor magnet 10 is extended upward with respect to the stator 9 of the drive motor M so as to allow the attracting force to act in the axial direction. Namely, the thrust plate 16A in this case also functions as a mere coming-off preventing means with respect to an external shock in transit or use.

In addition, an annular rising portion 11a is provided on the base 11 radially outwardly of the shaft 13A, and the stator 9 of the drive motor M is fixed to this rising portion 11a. Meanwhile, a lower portion of the sleeve 12A is accommodated in an annular recessed portion 23 surrounding the shaft 13A.

As for the assembling procedure, a predetermined amount of lubricant is poured in advance in the bottom of the inverse cup-shaped outer sleeve 12a. Then, the thrust plate 16A is placed flatly on the bottom of the outer sleeve 12a, and after the inner sleeve 12b is subsequently assembled, the shaft 13A integral with the base 11 is press-fitted and secured to the thrust plate 16A. As a result of the insertion of the shaft 13A, the lubricant in the bottom is filled in each bearing clearance between the thrust fluid bearing S and the radial fluid bearing R, passes through the lubricant supplying passage 20, and is also accumulated in the lubricant reservoir 19.

The other arrangements as well as operation and advantages are similar to those of the first embodiment.

Figure 3:
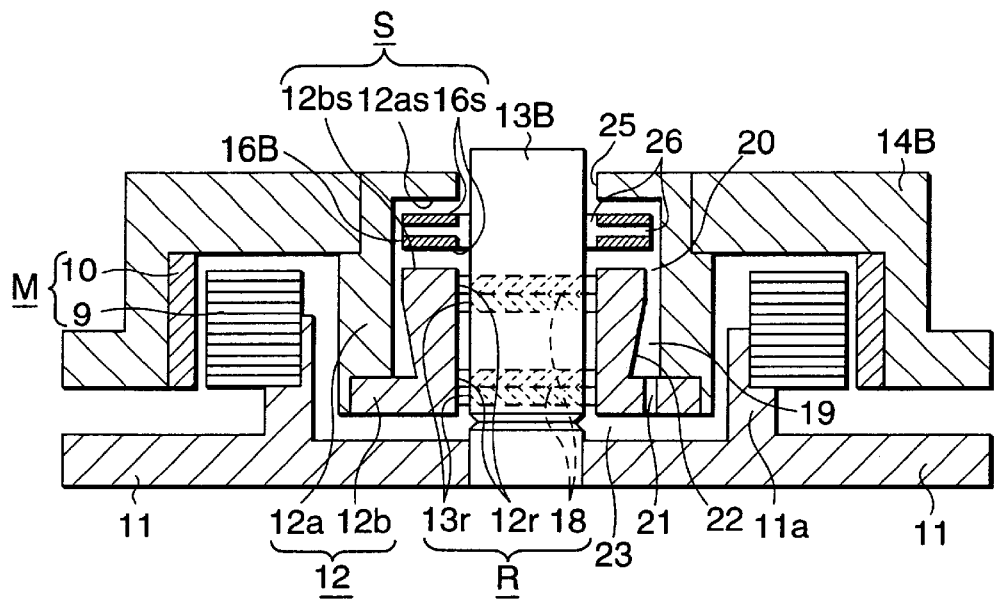
FIG. 3 is a cross-sectional view of a third embodiment of the present invention.

FIG. 3 is a cross-sectional view illustrating a third embodiment of the present invention.

In this third embodiment as well, in the same way as in the second embodiment, the spindle motor is of the type in which the shaft is fixed, and the sleeve is adapted to rotate.

However, a through hole 25 is provided in the center of a hub 14B, an upper end of a shaft 13B is made to project from the through hole 25 to the outside, so as to allow both ends of the shaft 13B to be fixed.

Figure 4A:
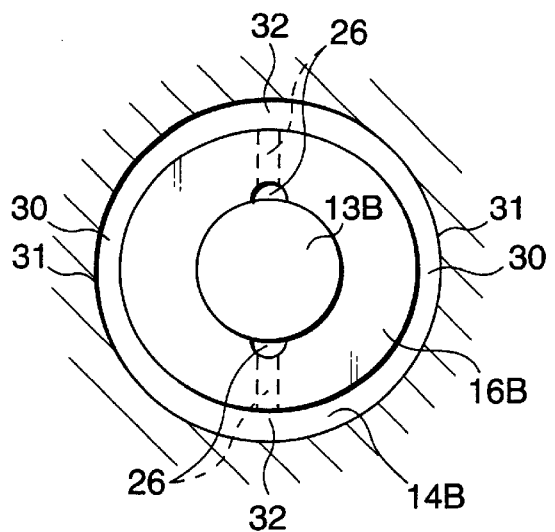
FIG. 4A is a plan view of a thrust plate portion shown in FIG. 3.

Further, air vent holes 26 are provided in a thrust plate 16B which is a component member of the thrust fluid bearing S, so as to render further reliable the separation and discharge of the bubbles remaining in the lubricant. In addition, the outer peripheral surface of the thrust plate 16B is formed elliptically, as shown in FIG. 4.

Namely, since the outer peripheral surface of the thrust plate 16B is formed elliptically, the circumferential clearance with respect to the inner peripheral surface of the hub 14B, i.e., its mating member, is varied, such that, during rotation, a lubricant 31 is held in portions 30 where the clearance is small by means of the wedging action and surface tension, while the bubbles are collected in portions 32 where the clearance is large, and are discharged through the air vent holes 26 communicating with the outside air.

In this case, since it suffices if the clearance is varied in the circumferential direction, the outer peripheral surface of the thrust plate 16b may be eccentrically circular or triangular in terms of its cross-sectional shape. However, the elliptical shape is preferable since the wedging action during rotation can be balanced and processing is facilitated.

The outer sleeve 12a constituting one part of a sleeve 12 of the dual structure is formed integrally with the hub 14B, and the inner sleeve 12b is detachably fitted to lower end of the outer sleeve 12a.

To assemble the bearing portions in this embodiment, the shaft 13B with the thrust plate 16B secured thereto is first inserted in the outer sleeve 12a formed integrally with the hub 14B, and the inner sleeve 12b is then assembled. In this state, if the lubricant is poured through the air vent holes 21 and, as necessary, through the clearance between the shaft 13B and the inner sleeve 12b, the lubricant is filled in each clearance between the radial fluid bearing R and the thrust fluid bearing S by means of the capillarity. Excess lubricant is held on the tapered surface of the lubricant reservoir 19 provided on the outer peripheral surface of the inner sleeve 12b. Subsequently, the base 11 is secured to the shaft 13B.

It should be noted that, instead of elliptically forming the outer peripheral surface of the thrust plate 16B, the outer peripheral surface may be formed in a completely round shape, a U-shaped groove may be formed in the vicinity of an axially central portion of the outer peripheral surface, and the bottom surface of the U-shaped groove may be formed in such a elliptical or eccentric circular shape that the clearance between the same and the inner peripheral surface of the hub 14B, i.e., its mating member, is varied in the circumferential direction. During the rotation, the lubricant is held in portions where the clearance is small by means of the wedging action and surface tension, and the bubbles are collected in portions where the clearance is large and are discharged through the air vent holes 26 communicating with the outside air. However, as the bottom of U-shaped groove, the elliptical shape is preferable since the wedging action during rotation can be balanced and processing is facilitated. If the U-shaped groove is thus provided, the bubbles which remain in the lubricant or are contained in conjunction with the rotation can be separated and discharged more reliably.

Figure 4B:
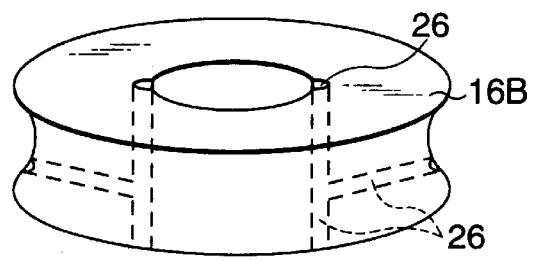
FIG. 4B is a perspective view of a hand drum shaped thrust plate.

Further, instead of elliptically forming the outer peripheral surface of the thrust plate 16B, the outer peripheral surface may be formed in a tapered shape starting from the vicinity of the axially central portion toward the end face (thrust fluid bearing surface 16as, 16bs) of the thrust plate, i.e., the outer peripheral surface of the thrust plate may be formed in a hand drum shape as shown in FIG. 4B, such that the clearance between the same and the inner peripheral surface of the hub 14B, i.e., its mating member, becomes narrower starting from the vicinity of the central portion toward the end face. Then, at least one air vent hole 26 communicating with the outside air is provided in the portion in the vicinity of the central portion of the thrust late 16B where the clearance is large. During the rotation or standstill, the lubricant is held in portions where the clearance is small by means of the surface tension, and the bubbles are collected in portions where the clearance is large and are discharged through the air vent hole 26 communicating with the outside air. Also by thus forming the outer peripheral surface of the thrust plate 16B such that the clearance between the outer peripheral surface of the thrust plate 16B and the inner peripheral surface of the mating member 14B becomes narrower toward the end face, it is possible to more reliably separate and discharge the bubbles which remain in the lubricant or are contained in conjunction with the rotation. Furthermore, even during high rotation, since the lubricant is constantly held in the vicinity of the end face of the outer peripheral surface of the thrust plate by means of the surface tension and is supplied to the thrust fluid bearing, there is no possibility of the bearing becoming seized due to a shortage of the lubricant.

The other arrangements as well as operation and advantages are similar to those of the first and second embodiments.

In addition, the thrust bearing may be a non-contact supported-type fluid bearing provided with a dynamic-pressure generating groove or a contact-supported-type pivot-supported bearing, as described above FIGS. 1 to 4.

Figure 5A:
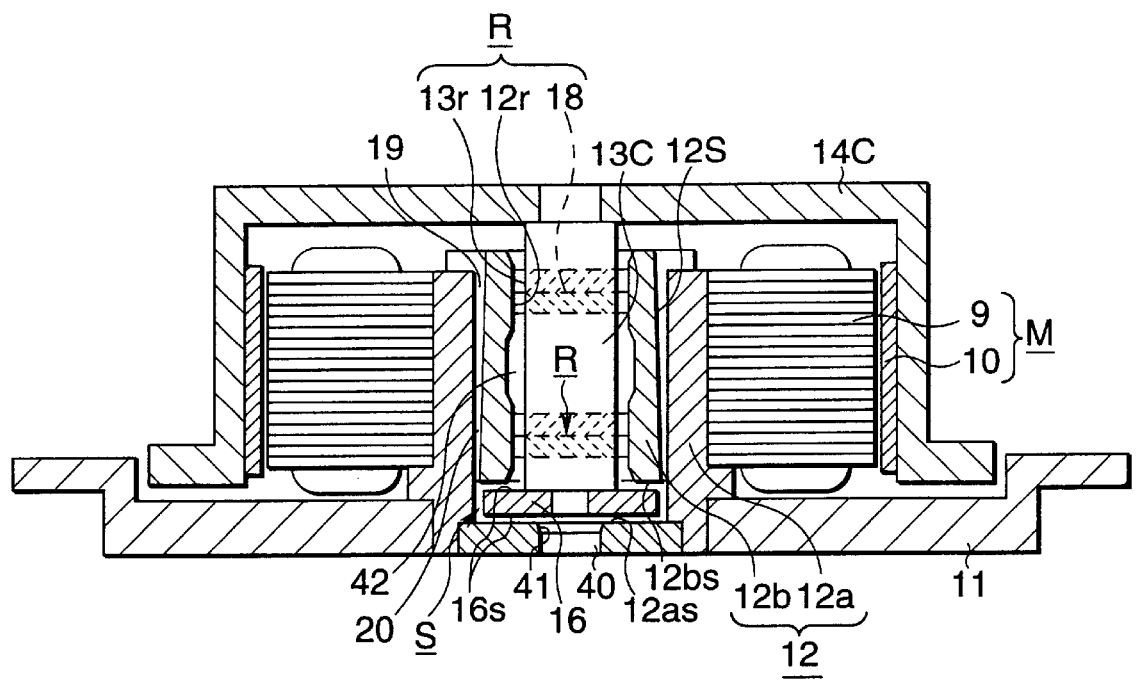
FIG. 5A is a cross-sectional view of a fourth embodiment of the present invention.
Figure 5B:
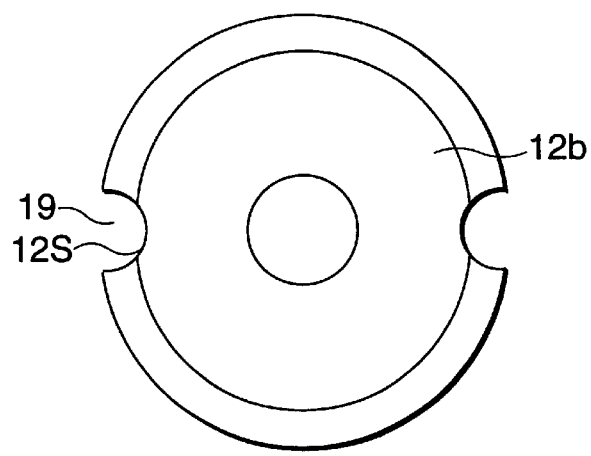
FIG. 5B is a plan view of an inner sleeve shown in FIG. 5A.

FIGS. 5A and 5B illustrate a fourth embodiment of the present invention.

This embodiment shows an example of the structure in which the shaft is adapted to rotate. However, this embodiment has slight different arrangements in several aspects, as will be described below.

As shown in FIG. 5B, a pair of tapered slits 12S whose depths are varied in the axial direction are provided in the outer peripheral surface of the inner sleeve 12b. Further, clearances between the same and the inner peripheral surface of the outer sleeve 12a, the mating member, are formed as the lubricant reservoirs 19, and their lower ends where the clearance is smallest are formed as the lubricant supplying passages 20.

In addition, the structure provided is such that a through hole 40 is passed through the bottom surface of the cup-shaped outer sleeve 12a to allow the bubbles mixed in during the pouring of the lubricant to be discharged to the outside through the through hole 40. Further, a tapered surface 41 is provided at an inner edge of the inner peripheral surface of the through hole 40 so as to hold the lubricant between the same and the opposing thrust plate 16 by means of the surface tension.

It should be noted that, to prevent the efflux of the lubricant from the through hole 40 to the outside due to its oozing out, it is preferable to provide oil repellency treatment barrier coating in advance by applying an oil repellent barrier film to the inner surface of the trough hole 40 and its vicinity. Further, to allow the lubricant to be held by the capillarity, the diameter of the through hole 40 may be made small to make the lubricant difficult to leak to the outside, or the through hole 40 may be made capable of being sealed by press-fitting a ball (a steel ball, a rubber ball, a plastic ball or the like) into the through hole 40 after the pouring of the lubricant.

In addition, as for oil repellency treatment, in light of improvement of the reliability, it is preferable to prevent the efflux of the lubricant due to its oozing out by applying, as required, the oil repellent not only to the vicinity of the through hole 40 but also to such as boundary portions where the lubricant comes into contact with the atmosphere on the slits 12S provided in the outer peripheral surface of the inner sleeve 12b and on the inner peripheral surface of the outer sleeve 12a.

Further, a relief 42 constituted by a tapered peripheral groove where the clearance becomes narrower toward the bearing clearance of each of a pair of upper and lower radial fluid bearings R,R is provided on the outer peripheral surface of the shaft (and/or the inner peripheral surface of the inner sleeve 12b) located between the pair of the upper and lower radial fluid bearings R. It is true that, if the depth of this tapered relief 42 is made deep, air becomes liable to become contained. Accordingly, as a countermeasure, a shaft hole which is open at an intermediate position between the upper and lower radial fluid bearings R, as well as an air vent hole for allowing this shaft hole to communicate with the outside, although neither are shown, may be provided in a shaft 13C having one end fitted in a hub 14C. During the assembly, this shaft hole and the air vent hole may be used as holes for pouring the lubricant into the radial fluid bearings R and the thrust fluid bearing S.

In the case of this embodiment, since the through hole 40 is passed through the bottom of the outer sleeve 12a, the method of pouring the lubricant such as the one used in the first embodiment cannot be used. For this reason, in this embodiment, the assembling and pouring of the lubricant are effected as follows.

First, a subassembly of the shaft 13C and the thrust plate 16 is inserted into the inner sleeve 12b, and the inner sleeve 12b is then press-fitted to the outer sleeve 12a, thereby assembling the bearing parts. It should be noted that, as the method of fixing the inner sleeve 12b and the outer sleeve 12a, not only press-fitting but also other means, such as bonding, press-fitting and calking, and press-fitting and bonding or the like, may be used.

After assembling the bearings, a predetermined amount of lubricant is filled in the lubricant reservoirs 19 between the inner sleeve 12b and the outer sleeve 12a. The lubricant flows from wide-clearance portions to narrow-clearance portions due to the surface tension, and is filled in the bearing clearances. It should be noted that, during this filling, since the air is relieved from the portion of the through hole 40 provided in the bottom of the outer sleeve 12a, it is possible to prevent the mixing of the bubbles into the lubricant, thereby making it possible to uniformly fill the lubricant into the thrust fluid bearing S as well. Then, the hub 14C is fitted to the upper end of the shaft 13C.

It should be noted that, as the method of pouring the lubricant, there is a method in which the lubricant is poured through the through hole 40 in the outer sleeve 12a after assembling the bearings. The lubricant poured into the through hole 40 is also filled into the bearing clearances and the tapered lubricant reservoirs 19 by means of the surface tension.

Here, a description will be given of materials of the members. As the material of the shaft, it is possible to use an austenitic stainless steel such as SUS 303, a martensitic stainless steel such as SUS 420 F, SUS 420 J 2, and SUS 440 C, a ferritic stainless steel such as SUS 430, a precipitation hardening stainless steel such as SUS 630, or a copper-based material. As the inner sleeve constituting the radial bearing, it is possible to use the above-described stainless steels in addition to copper alloys such as free-cutting brass, which facilitates the thread rolling of the groove and excels in machinability, as well as phosphor bronze. As the outer sleeve, it is possible to use a copper alloy, an aluminum alloy, or any one of the above-described stainless steels. Further, in the case of an aluminum alloy, the outer sleeve and the base may be processed as a unit.

It should be noted that if a martensitic stainless steel, a ferritic stainless steel, or the like is used as the outer sleeve 12a, an austenitic stainless steel is used as the shaft 13C, and a copper alloy is used as the inner sleeve 12b, it is possible to make the bearing clearances at high temperature smaller than at the time of room temperature in the light of the relationship among the coefficients of thermal expansion of the outer sleeve, the shaft, and the inner sleeve. Namely, by press-fitting the inner sleeve made of a copper alloy whose coefficient of thermal expansion is approx. $21 \times 10^{-6°}$ C. to the inner side of the outer sleeve whose coefficient of thermal expansion is approx. $11 \times 10^{-6°}$ C., the apparent coefficient of thermal expansion of the inner sleeve 12b becomes small and approaches the coefficient of thermal expansion of the outer sleeve.

If an austenitic stainless steel whose coefficient of thermal expansion is approx. $17 \times 10^{-6°}$ C. is used as the shaft 13C, since the coefficient of thermal expansion of the shaft 13C becomes greater than the apparent coefficient of thermal expansion of the inner sleeve 12b, the bearing clearance at high temperature can be reduced. Consequently, it is possible to compensate for a decline in the radial rigidity of the bearings due to a drop in the viscosity of the lubricant accompanying the temperature rise, thereby making it possible to obtain fluid bearings whose decline in the bearing performance at high temperature is small.

In addition, if a martensitic stainless steel or a ferritic stainless steel is used as the inner sleeve 12b, and an austenitic stainless steel is used as the shaft 13C, similar advantages can be obtained.

By appropriately selecting the materials of the outer sleeve, the inner sleeve, and the shaft and by selecting the coefficients of thermal expansion of the respective parts in the above-described manner, it becomes possible to control the bearing clearances when the temperature has changed, thereby making it possible to obtain fluid bearings whose change in the bearing performance due to temperature change is small.

It should be noted that in the case where a copper alloy or a free-cutting stainless steel is used as the shaft, finishing may be effected by cutting alone. In addition, in the case where finishing is effected by cutting alone, heat treatment of the stainless steel may be omitted to attain lower manufacturing cost.

In addition, instead of the green material, the bearing surface may be provided with heat treatment, plating, a DCL film, or a coating of TiN, CrN or the like so as to increase the surface hardness, or may be provided with a resin coating to improve the slidability. It should be noted that the materials of the shaft 13C, the sleeve 12, and the thrust plate 16 are not limited to metals, and resin or ceramics may be used.

Figure 6A:
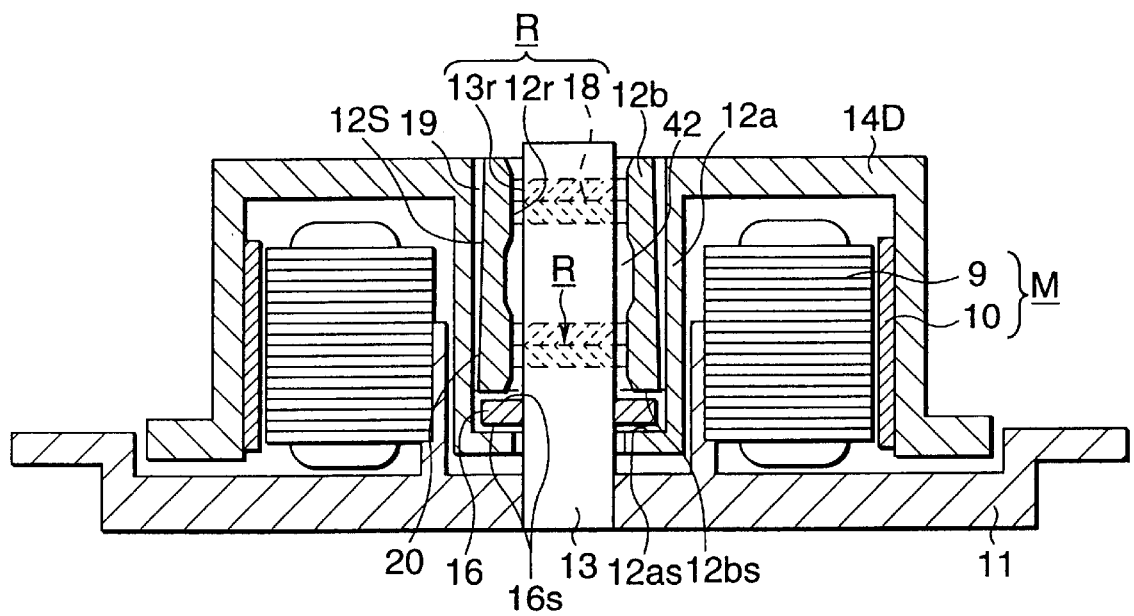
FIG. 6A is a cross-sectional view of a fifth embodiment of the present invention.
Figure 6B:
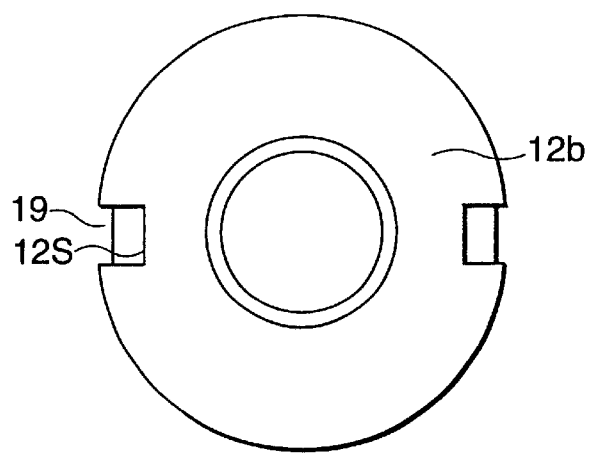
FIG. 6B is a plan view of the inner sleeve shown in FIG. 6A.

FIGS. 6A and 6B illustrate a fifth embodiment of the present invention.

The spindle motor of this embodiment has the shaft-fixed type structure which is substantially identical to that of the third embodiment shown in FIG. 3, but the thrust plate 16 is disposed in the vicinity of the fixed side of the shaft 13. This embodiment is similar to the case of FIG. 5A referred to earlier in that the pair of slits 12S with rectangular cross sections whose clearance is varied in the axial direction are provided in the outer peripheral surface of the inner sleeve 12b, that clearances between the same and the inner peripheral surface of the outer sleeve 12a, the mating member, are formed as the lubricant reservoirs 19, and that their lower ends where the clearance is smallest are formed as the lubricant supplying passages 20. However, the portion corresponding to the outer sleeve 12a is formed integrally on the inner side of a hub 14D as a tubular portion, and integrally rotates with the hub 14D together with the inner sleeve 12b.

A description will be given of the materials in accordance with this embodiment. As the hub 14D, a ferritic stainless steel such as SUS 430 is used to match its coefficient of thermal expansion with that of a glass disk mounted on the hub. In a case where the disk is an aluminum disk, an aluminum alloy is suitably used as the material of the hub.

In addition, in a case where a ferritic stainless steel is used as the hub 14D, in the same way as in the fourth embodiment, if an austenitic stainless steel is used as the shaft 13, and a copper-based material is used as the inner sleeve 12b, it is possible to make the bearing clearances at high temperature smaller than at the time of room temperature in the light of the relationship among the coefficients of thermal expansion of the shaft, the inner sleeve, and the hub. Namely, by press-fitting the inner sleeve 12b made of a copper alloy such as free-cutting brass whose coefficient of thermal expansion is approx. $21 \times 10^{-6°}$ C. to the inner side of the hub 14D made of a ferritic stainless steel whose coefficient of thermal expansion is approx. $11 \times 10^{-6°}$ C., the apparent coefficient of thermal expansion of the inner sleeve 12b becomes small and approaches the coefficient of thermal expansion of the ferritic stainless steel. It should be noted that if the thickness of the inner sleeve 12b is made thinner than the thickness of the tubular portion 12a of the hub which is the portion corresponding to the outer sleeve, the coefficient of thermal expansion of the inner sleeve 12b becomes substantially identical to that of the ferritic stainless steel used for the outer sleeve (the tubular portion of the hub) 12a.

If an austenitic stainless steel whose coefficient of thermal expansion is approx. $17 \times 10^{-6}$° C. is used as the shaft 13, since the coefficient of thermal expansion of the shaft 13 becomes greater than the apparent coefficient of thermal expansion of the inner sleeve 12b, the bearing clearance at high temperature can be reduced. Consequently, it is possible to compensate for a decline in the radial rigidity of the bearings due to a drop in the viscosity of the lubricant accompanying the temperature rise, thereby making it possible to obtain fluid bearings whose decline in the bearing performance at high temperature is small.

Incidentally, with respect to the above-described fourth and fifth embodiments, the lubricant reservoirs 19 between the inner sleeve 12b and the outer sleeve 12a are not confined to the structure formed by the axial slits 12S. Namely, it is possible to adopt not only the structure in which the inner and outer sleeves 12a and 12b are press-fitted as a unit, but it is also possible to adopt an annular clearance as shown in the cases of the above-described first to third embodiments. In that case, if a ferritic stainless steel such as SUS 430 is used as the inner sleeve 12b, and an austenitic stainless steel such as SUS 303 or SUS 304 is used as the shaft 13, the bearing clearances at high temperature can be made smaller than at the time of room temperature, so that a decline in the radial rigidity can be reduced.

Figure 7:
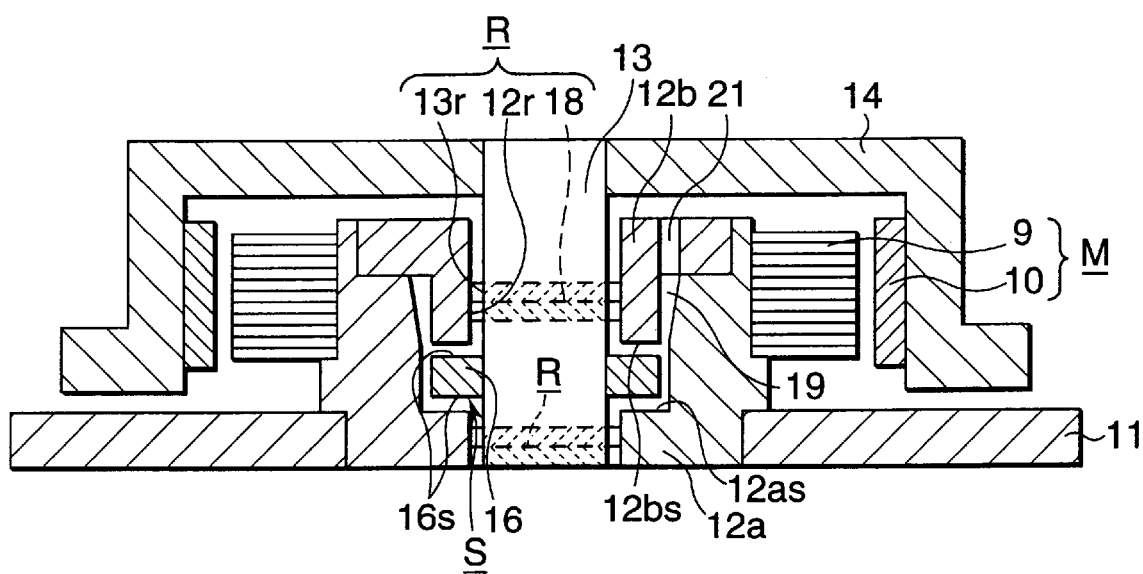
FIG. 7 is a cross-sectional view of a sixth embodiment of the present invention.

FIG. 7 illustrates a sixth embodiment of the present invention.

This spindle motor has the structure of the type in which the shaft is adapted to rotate and the sleeve is fixed, but two radial bearings R are provided separately for the inner sleeve 12b and the outer sleeve 12a. Namely, the thrust plate 16 is placed between the outer sleeve 12a and the inner sleeve 12b, and the radial bearings R are provided on the axially both sides of the thrust plate 16. For this reasons, the span between the radial bearings R can be widened, and there is an advantage in that the momental rigidity of the bearings can be enlarged.

It should be noted that the lubricant reservoir 19 formed by the annular clearance between the outer peripheral surface of the inner sleeve 12b and the inner peripheral surface of the outer sleeve 12a is structured such that its clearance becomes continuously narrower toward the bearing surface, and the lubricant is supplied from the lubricant reservoir 19 toward the radial bearings R and the thrust bearing S by means of the surface tension.

Figure 8:
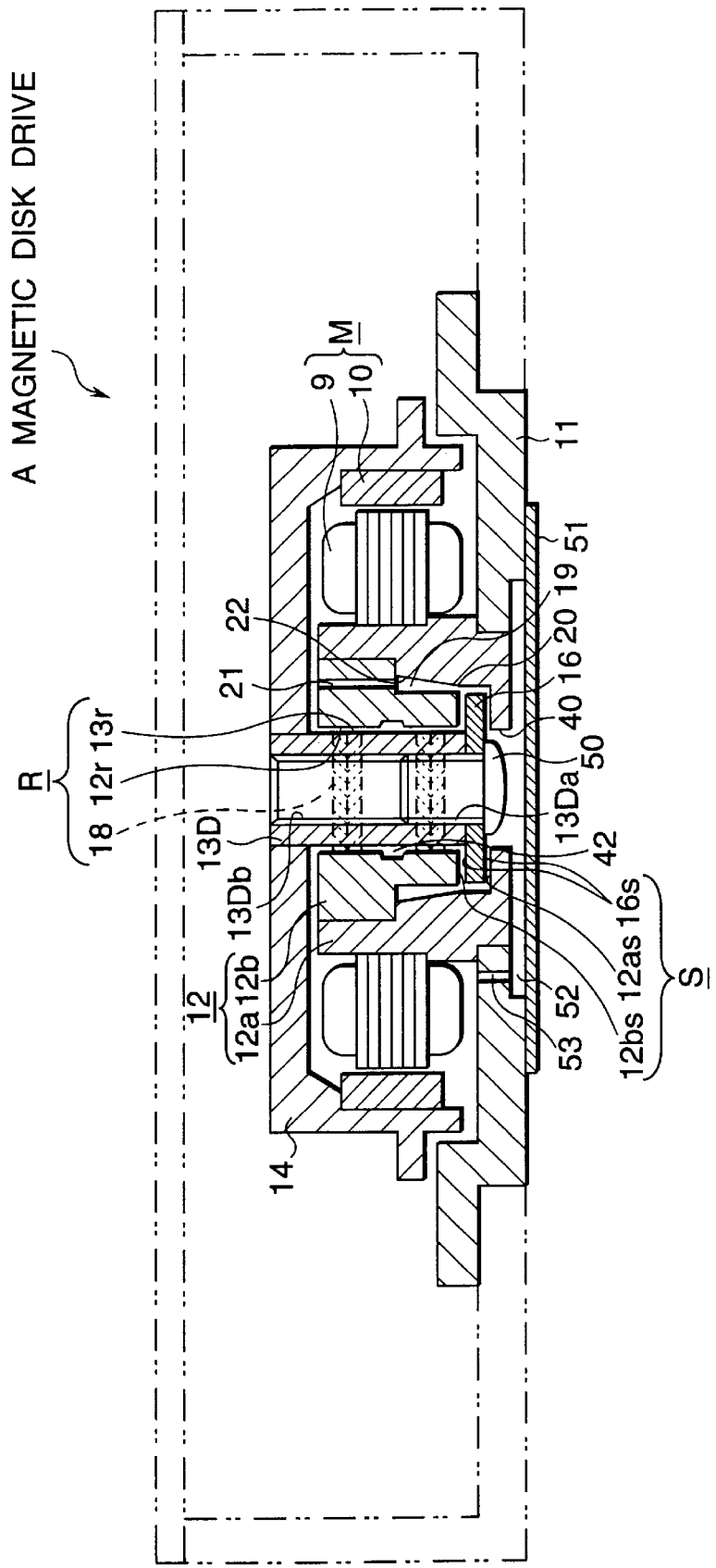
FIG. 8 is a cross-sectional view of a seventh embodiment of the present invention.

FIG. 8 illustrates a seventh embodiment of the present invention.

The spindle motor in accordance with this embodiment also has the structure of the type in which the shaft is adapted to rotate and the sleeve is fixed in the same way as the ones shown in FIGS. 1, 5A, and 7; however, the major difference lies in that the shaft is made hollow, and that the thrust plate is screwed down to the shaft. Namely, an internal thread 13Da for meshing with a thrust-plate fixing screw 50 is formed on an inner peripheral surface of a hollow shaft 13D on the lower end side thereof, while an internal thread 13Db for meshing with an unillustrated screw for fixing a mounted disk is formed on the opposite side thereof. The two internal threads 13Da and 13Db may be formed commonly, but they may be formed as mutually opposite threads to prevent the loosening of the threaded screws, or the sizes of the two threads may be made different. In addition, if the hole before threading is formed as a through hole, the cleaning of the shaft which is performed during the fabrication process can be facilitated.

As the thrust plate 16 is made to abut against the lower end face of the hollow shaft 13D, and the thrust-plate fixing screw 50 is passed through and threadedly engaged in the internal thread 13Da and is tightened, the shaft 13D and the thrust plate 16 can be formed integrally.

If the screwed-down structure is adopted, as compared with the structure (see FIGS. 1, 5A, and 7) in which the thrust plate is press-fitted and secured to the shaft, there is an advantage in that the strength and reliability excels since the coming-off load can be secured without being affected by the difference in the material between the shaft and the thrust plate and the surface accuracy of the fixing portion. In addition, there is an advantage in that when the dynamic-pressure generating grooves are formed on the thrust receiving surfaces 16s on the upper and lower sides of the thrust plate 16 by coining, it is possible to use a copper-based material requiring lower forming pressure and exhibiting better formability than a stainless steel.

It should be noted that the through hole 40 for accommodating the head of the thrust-plate fixing screw 50 is provided in the bottom of the outer sleeve 12a. The clearance between the head of the fixing screw 50 and the through hole 40 provides a surface tension seal for holding the lubricant. If this spindle motor is built into, for example, a magnetic disk drive (indicated by the dot-dashed line in FIG. 8), there is the possibility of the dust entering the interior of the bearings from outside the apparatus by passing through the through hole 40. Accordingly, a cover plate 51 is secured to the bottom of the base 11 to cover the through hole 40. However, there is the possibility that the lubricant held in the bearing clearances may become extruded if the internal pressure changes due to the expansion of the air in the space of the through hole 40 owing to a temperature change during the use of the spindle motor. To prevent this from occurring, a ventilation hole 53 for allowing the space in the through hole 51 and a space 52 between the outer sleeve 12a and the cover plate 51 to communicate with the interior of the magnetic disk drive is provided in the base 11.

It goes without saying that if there is no possibility of the entrance of dust or the like, there is no need to particularly provide the aforementioned cover plate 51.

The other arrangements as well as operation and advantages are substantially similar to those of the first embodiment.

Figure 9:
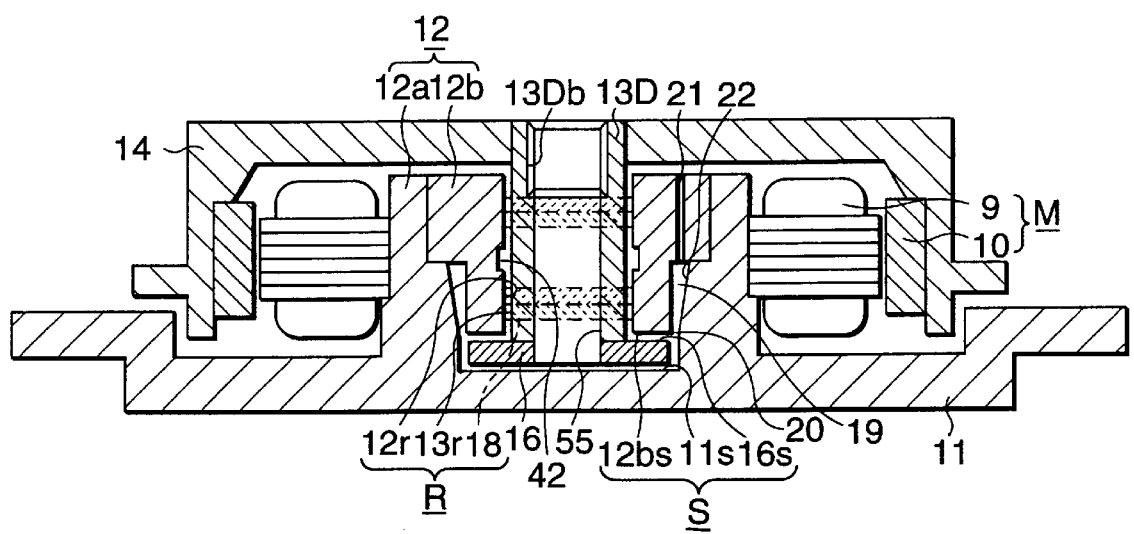
FIG. 9 is a cross-sectional view of an eighth embodiment of the present invention.

FIG. 9 illustrates an eighth embodiment of the present invention.

In this embodiment as well, the hollow shaft 13D is adopted; however, to reduce the number of component parts and eliminate the possibility of the lubricant leaking to the outside, the outer sleeve 12a and the base 11 are formed integrally, and the bottom of the outer sleeve 12a is closed. In addition, this embodiment further differs from the above-described seventh embodiment in that the thrust plate 16 is secured to the lower end portion of the hollow shaft 13D not by being screwed down but by being press-fitted.

In the same way as in the first embodiment, the assembling in this case is effected in the procedure in which the thrust plate 16 is placed flatly on the bottom of the outer sleeve 12a, and an appropriate amount of lubricant is poured onto it from above, and the hollow shaft 13D secured integrally to the hub 14 is subsequently press-fitted to the thrust plate 16. When the hollow shaft 13D is assembled to the bottom of the outer sleeve 12a, since the air passes through a central hole 55 in the hollow shaft 13D and is vented outside the spindle motor, the air interposed between the shaft end and the bottom of the outer sleeve 12a is prevented from remaining in the lubricant in the form of bubbles.

Therefore, even if the atmospheric pressure has changed during air transport of the spindle motor or the ambient temperature has risen during its use, the situation is prevented in which the bubbles remaining in the lubricant are expanded to extrude the lubricant in the bearing clearances, resulting in a shortage of the lubricant. Thus, the reliability of the spindle motor improves.

It should be noted that the thrust receiving surfaces 16s on both sides of the thrust plate 16, as well as the thrust bearing surface 11s formed on the bottom of the outer sleeve 12a integral with the base 11 in face-to-face relation thereto, maybe provided, as necessary, with surface hardening treatment such as a DLC film coating, plating, alumite treatment, or the like.

The other arrangements as well as operation and advantages are substantially similar to those of the first embodiment.

Figure 10:
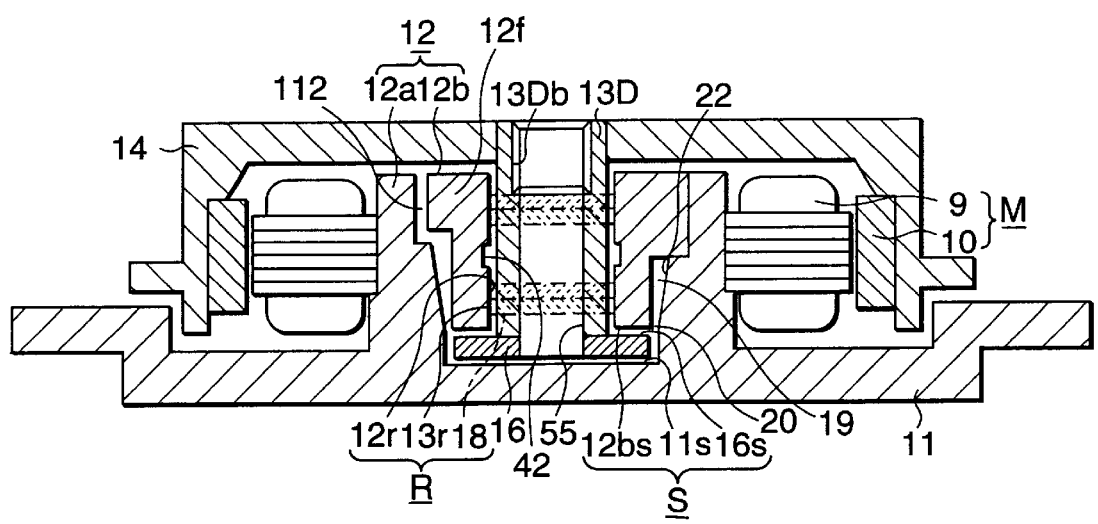
FIG. 10 is a cross-sectional view of an ninth embodiment of the present invention.

FIG. 10 illustrates a spindle motor according to an ninth embodiment of the present invention.

The spindle motor of this embodiment is of the type in having a fixed sleeve and a rotatable shaft, and is substantially indentical to that of the eighth embodiment shown in FIG. 9, whereas a slit 112 is provided instead of the air vent hole 21 shown in FIG. 9.

The slit is extending in the axial direction of the shaft 13D which is provided in the inner peripheral surface of the outer sleeve 12a at a fitting surface which is disposed between the outer peripheral portion of the flange 12f formed on the inner sleeve 12b and the inner peripheral surface of the outer sleeve 12a.

The slit 112 is connected to the tapered surface of the outer peripheral of the outer sleeve 12a, to thereby communicate the upper end side of the lubricant reservoir 19 closed by the flange 12f of the inner sleeve 12b with the outside of the bearing clearance.

Further, the slit 112 may be formed on the outer peripheral surface of the inner sleeve 12b, or may be formed on both the inner peripheral surface of the outer sleeve 12a and the outer peripheral surface of the inner sleeve 12b.

The other arrangements as well as operation and advantages are substantially similar to those of the eighth embodiment.

As described above, in accordance with the invention according to claim 1, since the lubricant reservoir communicating with the bearing clearance via a clearance of a size exhibiting capillarity is provided on the outer peripheral side of the sleeve whose inner periphery opposes the shaft, the replenishment of lubricant to the interior of the fluid bearing clearance where the lubricant decreases with the lapse of time can be reliably effected automatically. As a result, an advantage can be offered in that a spindle motor excelling in durability can be obtained.

In addition, since the end portion of the lubricant reservoir is made to communicate with the outside, the bubbles remaining in the lubricant can be easily discharged naturally, and the instability of the bearing lubrication due to the remaining bubbles can be eliminated. Consequently, it is possible to obtain an advantage in that a spindle motor excelling in reliability can be provided.

Furthermore, since the lubricant reservoir is disposed on the outer peripheral side of the inner sleeve, the overall height of the apparatus can be lowered, so that an advantage can be obtained in that the spindle motor can be made further compact.

What is claimed is:

1. A spindle motor with fluid hydrodynamic bearings, comprising:

a shaft;

a sleeve which is relatively rotatable with respect to said shaft via a bearing clearance between said shaft and said sleeve; and a lubricant reservoir formed as a gap between said sleeve and an opposite member of said sleeve, wherein said lubricant reservoir becomes more narrow toward said bearing clearance and said sleeve and said opposite member of said sleeve are not relatively rotatable with respect to each other, wherein a bearing lubricant of said lubricant reservoir is supplied to said bearing clearance by capillary action.

2. The spindle motor according to claim 1, wherein said lubricant reservoir has one end which communicates with said bearing clearance and another end which communicates with the outside atmosphere.

3. The spindle motor according to claim 1, wherein said lubricant reservoir is formed at an outer peripheral surface of said sleeve.

4. The spindle motor according to claim 1, wherein at least one of an outer peripheral surface of said sleeve and an inner peripheral surface of the opposite member is provided with a tapered surface.

5. The spindle motor according to claim 1, wherein at least one of an outer peripheral surface of said sleeve and an inner peripheral surface of said opposite member is provided with a tapered slit having a depth which is varied along an axial direction of said shaft.

6. The spindle motor according to claim 1, further comprising a thrust plate, wherein said lubricant reservoir communicates with an annular clearance between an outer peripheral surface of said thrust plate and an inner peripheral surface of said opposite member of said sleeve.

* * * * *